O. HOFF.
METHOD OF SINKING SUBAQUEOUS TUNNELS.
APPLICATION FILED JUNE 1, 1908.

907,357.

Patented Dec. 22, 1908.
10 SHEETS—SHEET 2.

O. HOFF.
METHOD OF SINKING SUBAQUEOUS TUNNELS.
APPLICATION FILED JUNE 1, 1908.

907,357.

Patented Dec. 22, 1908.
10 SHEETS—SHEET 3.

O. HOFF.
METHOD OF SINKING SUBAQUEOUS TUNNELS.
APPLICATION FILED JUNE 1, 1908.

907,357.

Patented Dec. 22, 1908.
10 SHEETS—SHEET 4.

WITNESSES:
A. M. Dorr.
A. M. Mayer.

INVENTOR
Olaf Hoff
BY
ATTORNEYS.

O. HOFF.
METHOD OF SINKING SUBAQUEOUS TUNNELS.
APPLICATION FILED JUNE 1, 1908.

907,357.

Patented Dec. 22, 1908.
10 SHEETS—SHEET 5.

O. HOFF.
METHOD OF SINKING SUBAQUEOUS TUNNELS.
APPLICATION FILED JUNE 1, 1908.

907,357.

Patented Dec. 22, 1908.
10 SHEETS—SHEET 6.

WITNESSES:

INVENTOR
Olaf Hoff
BY
ATTORNEYS.

O. HOFF.
METHOD OF SINKING SUBAQUEOUS TUNNELS.
APPLICATION FILED JUNE 1, 1908.

907,357.

Patented Dec. 22, 1908.
10 SHEETS—SHEET 7.

WITNESSES:
A. M. Dow.
A. M. Mayer.

INVENTOR
Olaf Hoff
BY
ATTORNEYS.

O. HOFF.
METHOD OF SINKING SUBAQUEOUS TUNNELS.
APPLICATION FILED JUNE 1, 1908.

907,357.

Patented Dec. 22, 1908.
10 SHEETS—SHEET 9.

UNITED STATES PATENT OFFICE.

OLAF HOFF, OF TARRYTOWN, NEW YORK.

METHOD OF SINKING SUBAQUEOUS TUNNELS.

No. 907,357. Specification of Letters Patent. Patented Dec. 22, 1908.

Application filed June 1, 1908. Serial No. 435,904.

*To all whom it may concern:*

Be it known that I, OLAF HOFF, a citizen of the United States of America, residing at Tarrytown, in the county of Westchester and State of New York, have invented certain new and useful Improvements in Methods of Sinking Subaqueous Tunnels, of which the following is a specification, reference being had therein to the accompanying drawings.

This invention relates to the construction of that class of subaqueous tunnels, which are formed by a series of preconstructed tunnel tube sections built on shore, launched and floated to the tunnel site and then sunk in position thereon one after another in a trench prepared to receive them.

My invention embodies certain improvements in the method of carrying out the construction which is especially devised for the building of tunnels across navigable waters where it is important to carry on the work expeditiously and by such a method as will offer the least possible temporary surface obstruction to navigation and will also make it possible to carry the tunnel to no greater depth than suffices to avoid interference with vessels passing thereover.

My construction provides a tunnel built wholly of steel and concrete and resting upon a continuous foundation also preferably built of steel and concrete and forming an integral part of the completed tunnel itself. That part of the structure which is of steel is all constructed on land and consists of steel grids for the foundations and of tunnel tube sections each of which may be composed of one or more steel tubes of several hundred feet in length. The steel grids form part of an initial foundation constructed upon the water bed and upon this the tunnel tube sections are sunk.

In sinking each section to its prepared foundation upon the water bed, water is gradually let into the tube and the sinking is controlled by air cylinders attached to the top of the section and adapted to support the weight of the tube, or nearly so, in sinking. After the section is sunk and joined to the previously laid section it is embedded in concrete and one of the novel features of my invention consists in so constructing the tunnel tube section that it serves as a form for the concrete, and in providing a continuous foundation of concrete upon the water bed. After one or more sections are thus laid, the water is removed from the inside thereof and the final step in the completion of the tunnel may be commenced by lining the tubes on the inside with concrete. To carry out all these different steps in the construction I employ special means and novel methods which practically permit all the work to be carried out with ordinary skilled labor under ordinary working conditions, thus avoiding all danger and risks incident to working under air pressure or other abnormal conditions incident to other methods, all as more fully hereinafter described and shown in the accompanying drawings, in which my invention is shown as applied to a tunnel constructed of tunnel tube sections of the double or twin tube type and embodying the structural features claimed in my pending application Serial No. 428013, filed April 20, 1908.

Fig. 3 is a cross-section of a tunnel tube section in position upon the water bed and illustrating the method of embedding it in concrete.

The tunnel tube sections may be made several hundred feet in length according to the facilities for handling them and may be composed of one or more tubes 1, the drawings showing two tubes, arranged parallel with each other in accordance with the usual practice followed in constructing tunnels for railway purposes. The shell of each tube is formed of steel plates and constructed in the manner of building the shells of steam boilers. For railway purposes, it may have a diameter of 23 feet more or less, and may be formed of plates ⅜ of an inch in thickness.

The tubes are reinforced on the outside by a series of transversely extending steel partitions or diaphragms 2 reinforced at the edges by angle flanges 4. These diaphragms are spaced apart and inclosed between side walls 3, preferably formed of wooden sheathing secured to the lateral edges of the diaphragms and spaced from the tubes thereby. The diaphragms are approximately of rectangular shape, being preferably cut away at the lower corners to conform the side walls 3 more nearly to the sloping sides of the trench, and they extend completely around the tubes and form a level base for the support of the tubes upon the water bed. They may be made in one piece but preferably are vertically divided between the tubes and secured together at their meeting edges, as will be more fully hereinafter explained. In this manner the tubes are set in an outer cradle-like frame which imparts great structural strength and at the same time serves as a form for embedding the tubes in concrete, the intervals between the diaphragms forming a series of separate pockets. Half-way between each of the diaphragms the tubes are also preferably reinforced on the inside by stiffening angles 5, Fig. 13, to which are removably attached radial rods 6 as shown, the ends of the tubes being similarly reinforced to prevent deformation in handling.

Figure 7:
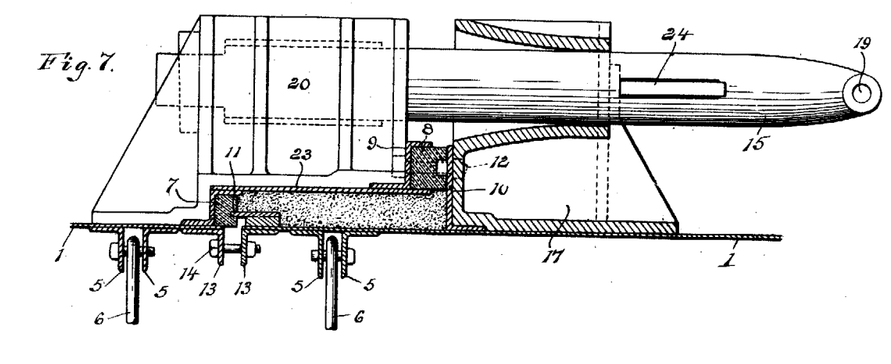
Figs. 7, 8, 9 and 10 are substantially side and end elevations of the means provided at the ends of the tube sections for registering the sections and also showing in Figs. 7 and 9 in cross-section the joint connecting the sections.
Figure 8:
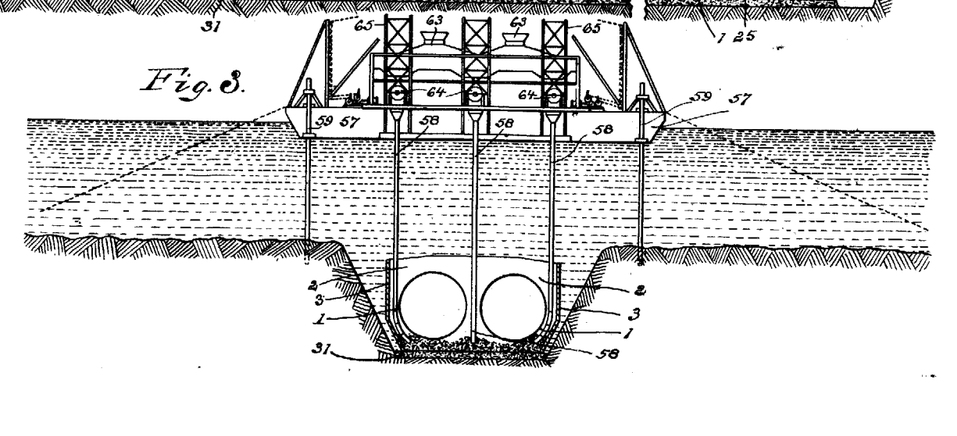
Figure 9:
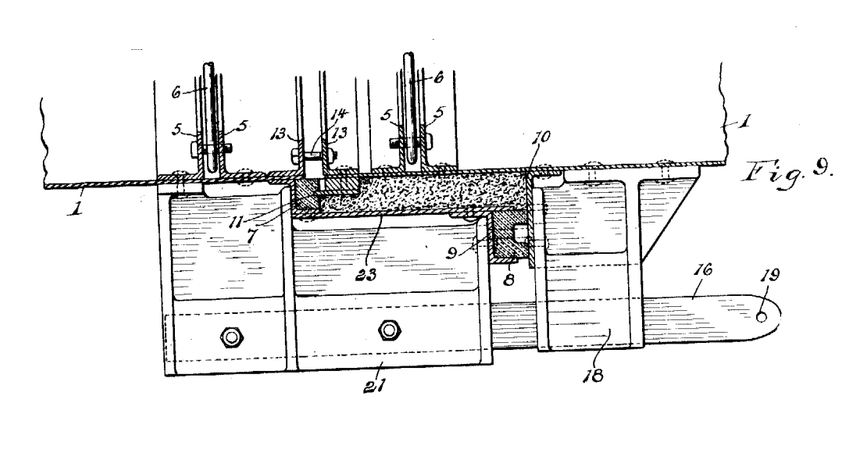
Figure 10:
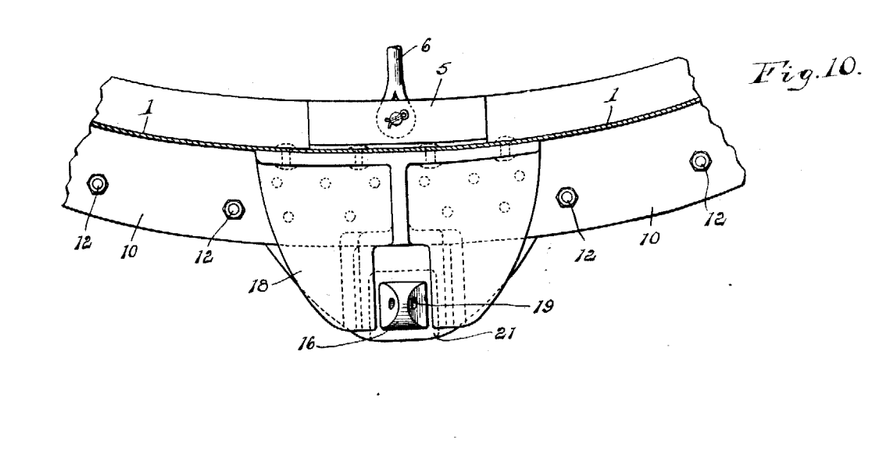

Each section of tube is provided with means at the ends for joining the sections together. These means consist of a sleeve 23 secured to and forming an enlarged socket at the end of one tube (Figs. 7 and 9) and of two rubber gaskets 7 and 8, one seated on the bottom of the socket and the other seated in a channel flange 9 secured at the extreme end of the sleeve. The end of the section to be joined thereto is adapted to enter the sleeve to the full depth of the socket, forming an annular space between it and the inner wall of the sleeve, and is provided with an outstanding flange 10 at a distance from its end and a longitudinally projecting edge flange 11 at its extreme end, both so arranged that they coöperate with the gaskets 7 and 8 to form two water tight joints when the sections are joined together, suitable bolt holes being provided in the flanges 9 and 10 and gasket 8 for the insertion of bolts 12 to draw the sections together and permanently unite them. In this manner a water tight annular space is formed in the socket between the two joints and after the sections are connected upon the water bed this space is filled with liquid cement, provision for filling being made in the construction of the sections, as will be explained more fully hereinafter.

Provision is also preferably made to bolt the sections together on the inside after access is had thereto at a later stage in the construction, by securing angle bars 13 to the inner surface of the tubes at their ends and providing bolts 14 passing through these bars. The space between the angle bars 13 may be calked if necessary.

In order to insure an absolute and exact connection between the tubes, each tube is provided with one or more steel pilot pins 15 and 16 (see Figs. 7 to 10) preferably placed one on top and one at the bottom. The pilot pins are taper pointed and are adapted to guide the tubes into position by entering sockets in the guide lugs 17, 18 provided on the ends of the adjacent tubes. The guide lug 17 forms a bell-shaped socket to guide the pilot pin 15 and the latter is provided with a key way for the insertion of a transverse key 24 to hold it in engagement with the guide lug. The pilot pins are provided with eyes 19 at the points for the attachment of cables thereto as will appear more fully hereinafter and one or both may be detachably secured in lugs 20, 21 riveted to the end of the tube. To compensate for irregularities in the size of the tubes, the guide lug 18 is adapted to provide for a vertical play of its pilot pin.

Figure 12:
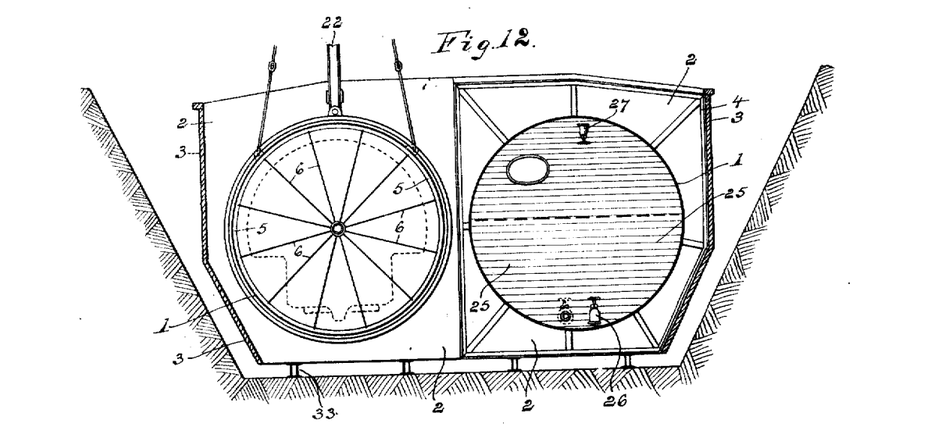
Fig. 12 is a cross-section of the same on the line 12—12 of Fig. 11.

Provision is also made for the attachment to the tubes of transit rods 22 (see Fig. 12), which are detachably secured in prescribed positions and serve a well-known purpose in sinking the tubes.

Figures 1, 2:
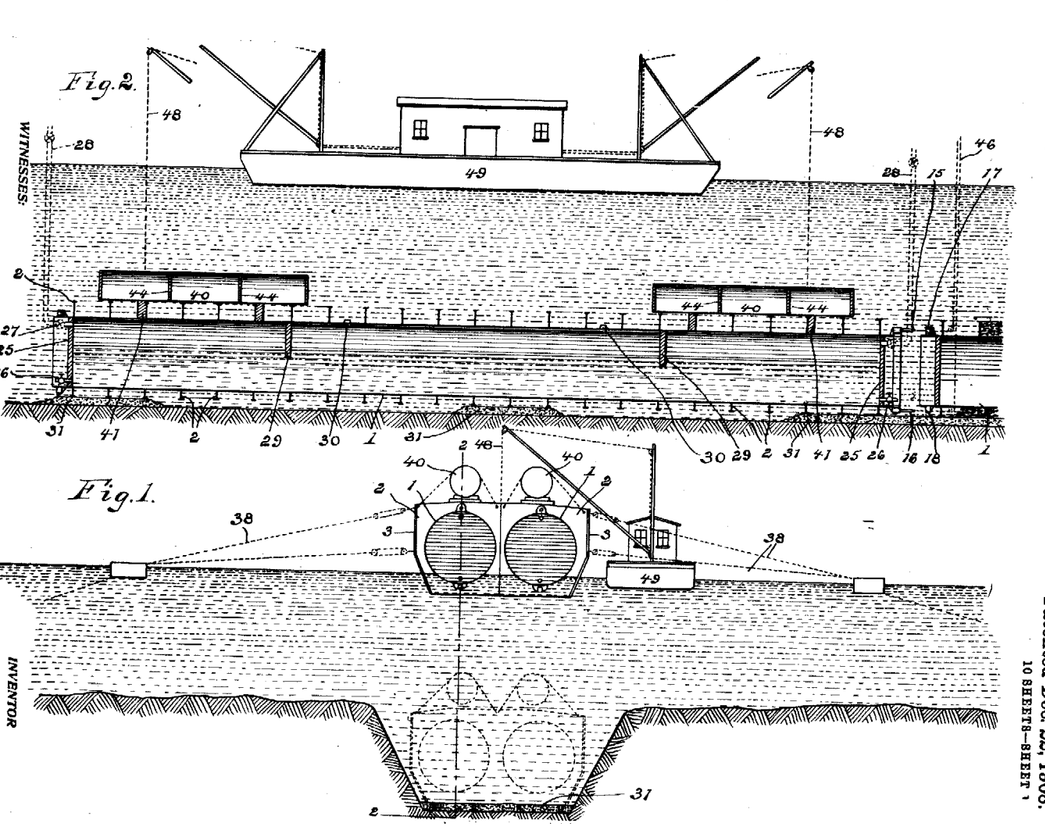
Figure 1 represents an end elevation of a tunnel tube section in position for sinking, the dotted lines indicating its position after being sunk.
Fig. 2 is a longitudinal vertical section of Fig. 1, substantially on line 2—2 and with the tunnel tube section in the position shown by the dotted lines in Fig. 1.
Figure 20:
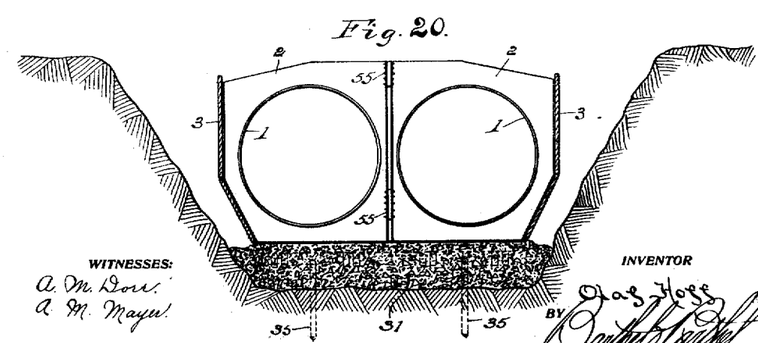
Fig. 20 is a cross-section of the completed foundation and of a tunnel tube section supported in position thereon.
Figures 21, 22:
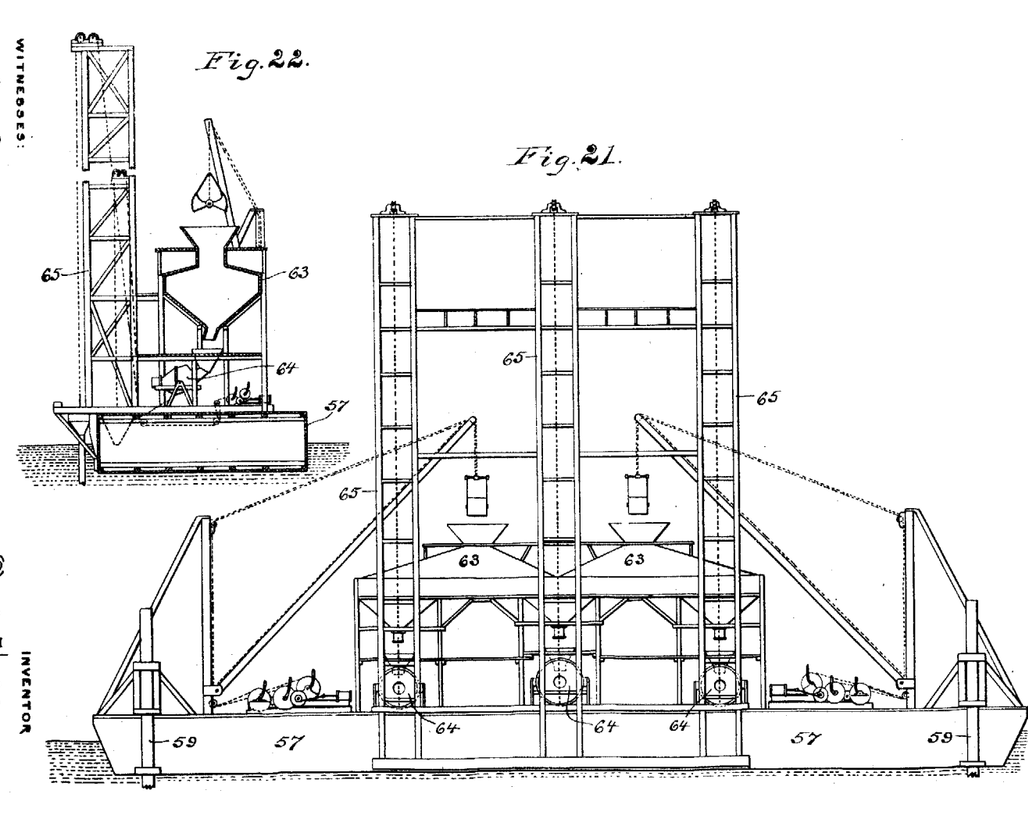
Fig. 21 is an enlarged side elevation of the concreting scow shown in Figs. 3 and 4.
Fig. 22 is a sectional end elevation of Fig. 21.

Before each section is launched, the ends of the tubes are closed with temporary bulkheads 25 (Fig. 12), to permit of the section being launched and towed to the tunnel site, and water inlet valves 26 and air outlet valves 27 are suitably placed in these bulkheads, the latter valves being preferably adapted for connection with flexible hose 28 as shown in Fig. 2. I also preferably place semi-partitions 29 in the upper half of the tubes intermediate their ends and provide separate air outlets 30 on top between these partitions. Before a section is launched, the site for it on the water bed is prepared, commencing at the shore end of the tunnel where the laying of the sections begins, by digging a trench of suitable depth to prevent the tunnel from forming an obstruction to navigation, and upon the bottom of this trench a suitable foundation 31 (Fig. 20) is built for each section.

Figure 17:
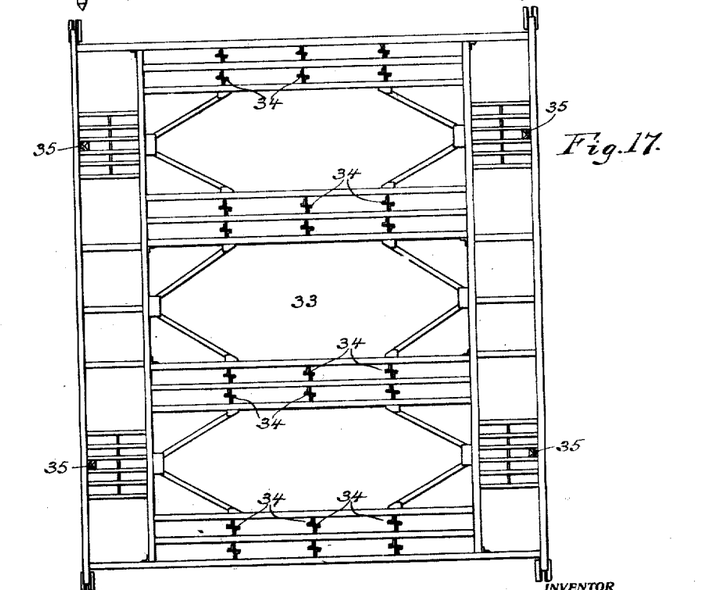
Fig. 17 is a plan view of the grid used in the tunnel foundation.
Figure 18:
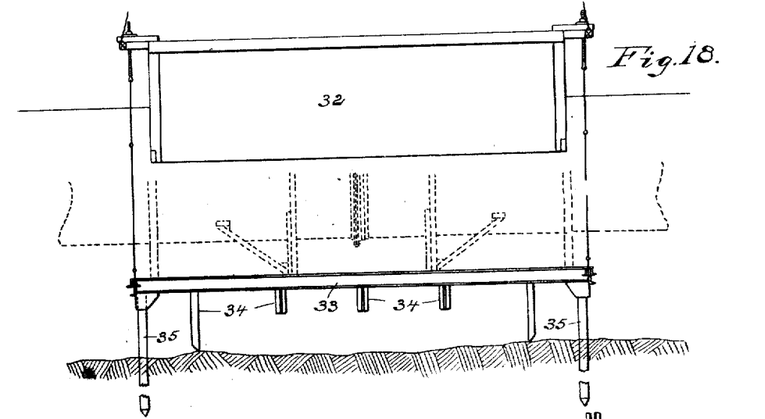
Fig. 18 is an end elevation of the grid, illustrating also the method of sinking it in position upon the water bed, the dotted lines indicating the manner in which the tunnel tube sections are intended to rest thereon after the foundation is completed.
Figure 19:
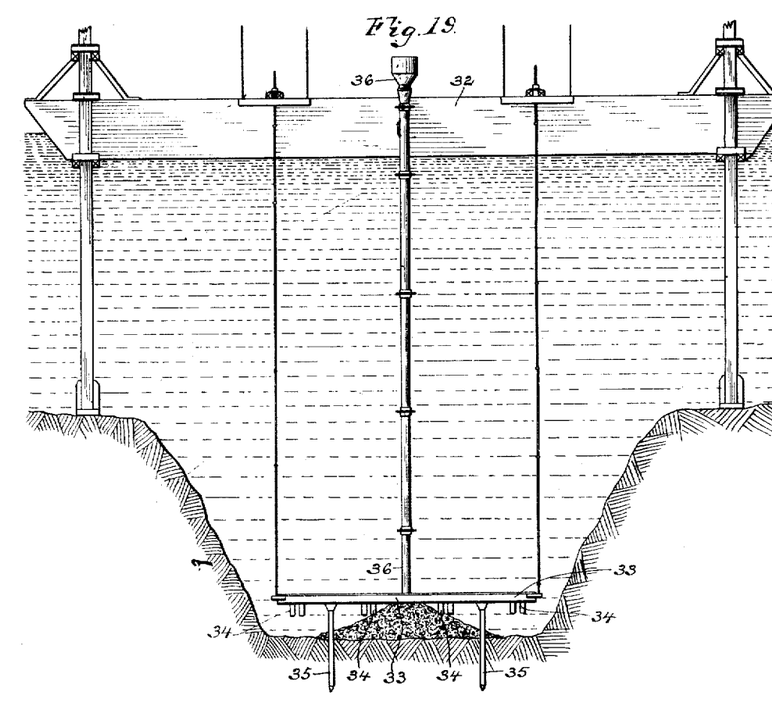
Fig. 19 is a cross-section through the trench forming the tunnel site and illustrating the method of building the foundation.

In my construction I provide initially, only for the support of each section at the middle and at the two ends, by sinking there a grid 33 constructed of structural steel substantially as shown in Figs. 17 and 18. Secured to this grid and suitably distributed throughout its length are a number of anchor posts 34 and 35 projecting downwardly from it, the anchor posts 35 being of sufficient length to serve as piles. This grid is built on land and transported to the tunnel site where it is sunk thereon by suspending it from a scow 32, as shown in Figs. 18 and 19, the scow being held in justified position by means of anchors or spuds so that the grid will be dropped upon the exact spot where it is intended to lie. By pounding it down, the anchor posts 35 are driven into the ground till the whole grid lies at the required level above the water bed to support at the proper height, the tube sections which are intended to lie directly with the diaphragms upon these grids. By means of the same scow, concrete is then poured through tremies 36 upon the water bed beneath the grid and into the interstices thereof till the whole grid is embedded, or partially so, within a solid mass of concrete. Instead of concrete, the foundation may be made by filling in with sand, gravel, broken stone or other suitable material and when so filled in the foundation is then ready for sinking the section thereupon.

Figure 5:
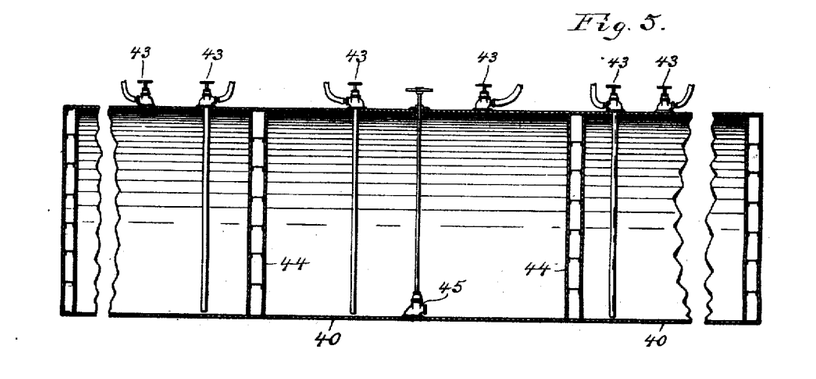
Fig. 5 is a longitudinal vertical section through one of the air cylinders used in sinking each tunnel tube section.
Figure 6:
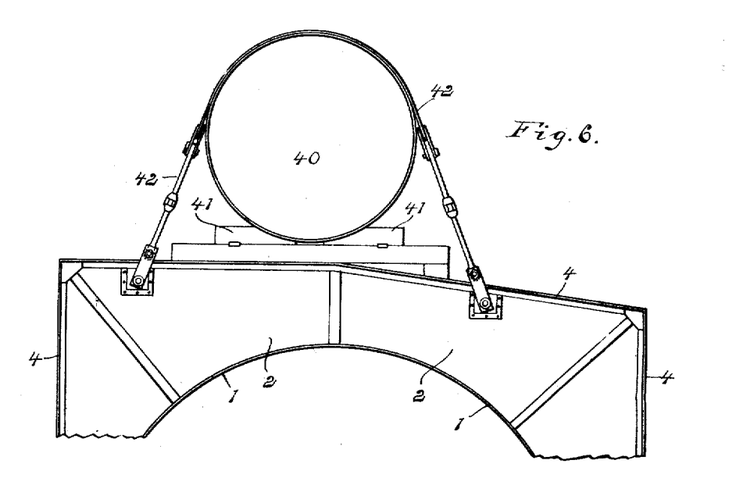
Fig. 6 is an end elevation of one of these air cylinders, showing, in connection therewith, the means for securing it in position upon the tunnel tube section.

When a section has been floated to the site prepared for it, it is secured in justified position by means of suitable cables 38 and each tube is then equipped with two air cylinders 40, see Figs. 1 and 6, which are supported in cradles 41 provided for them on top of the tubes and detachably and adjustably secured therein by straps 42 attached to the diaphragms of the tubes. The object of these air cylinders is to sustain by their buoyancy, the weight of the tubes when submerged and filled with water, so that the tubes will not be overstrained at any joint, or joints sprung during handling, causing leaks. These cylinders are proportioned according to the weight they will have to support in sinking and their buoyancy is adjusted by means of letting water into them or blowing water out of them. Compressed air is used for this purpose and the cylinders are equipped with proper flexible piping controlled by valves 43 (see Fig. 5). Each cylinder is preferably divided by bulkheads 44 into a central and two end compartments, the central compartments having a water admission valve 45 in its underside with a valve stem extending out through the top.

When all is ready for sinking, wire ropes 46 (Fig. 2) are fastened to the eyes in the pilot pins and passed down by divers to the end of the tubes already sunk and concreted in, there the ropes are passed through the sockets in the guide lugs corresponding to the pilot pins, thence over suitable pulleys (not shown) fastened to the tubes near the guide lugs and up through the water to winches on the scow, all being so arranged that these ropes in connection with suitable lines secured to the outer end of the section absolutely control the endwise movement in sinking.

The sinking of the section may be carried out with the aid of a single scow 49, by first opening the inlet valves 26 at the bottom of the bulkheads 25 in the tubes and likewise opening the corresponding air valves 27 at the top of the bulkheads. Water is thus let in and the air let out, causing the tubes to gradually settle down in the water at a speed dependent upon the inflow of the water, and are therefore under perfect control. As soon as the water in the tubes rises high enough to reach the semi-partitions 29 the air in the top of the tubes between said partitions and the bulkheads becomes trapped and by properly manipulating the valves controlling the escape of the air therefrom the equilibrium of the tubes is readily maintained and no plunging can occur. To thus control the tubes during their entire descent valved hose 28 may be attached to the air outlets 27 and manipulated from floats or scows overhead, (see Fig. 2). By permitting the confined air in the tubes to thus gradually escape under control of the air valves, the tubes continue to slowly sink until caught up by the air cylinders. These cylinders being adjusted, as previously described, to sustain the weight of the submerged tubes to within a small margin, say 10,000 pounds, at each end, the tubes are readily upheld, free to be raised or lowered, by means of two lines 48 (see Figs. 1 and 2) from suitable derricks on the scow 49 secured alongside. The sinking of the tubes is thus accomplished in a simple manner and under absolute control with the tubes evenly balanced and not overstrained at any point. However, some of the provisions herein made for the sinking of the tubes may be omitted as circumstances may warrant, all of which may be left to the discretion of the engineer in charge.

As the tubes sink to the water bed, the lines 46 attached to the pilot pins are taken up and the section is landed on the prepared foundation. By pulling in on these lines the section is moved toward the one to which it is to be joined till the tubes are in proper engagement for making the connections. A diver then secures the section from moving endwise out of engagement, by driving the wedge keys 24 into the pilot pins 15, and the tubes are then brought into proper alinement by means of the transit rods 22. When the alinement of the section is accomplished, the diver will insert the bolts 12 through the flanges 9 and 10, bolting them firmly together, and insert the necessary shims under the diaphragms to form an absolute even bearing at all points where the foundation is provided. The air cylinders 40 are next permitted to gradually fill with water, this causing the weight of the tubes supported by them to be gradually transferred to the foundation, and slackening the bands 42 so that they may be disconnected to release the air cylinders which may then be floated to the top by expelling the water therefrom. The same air cylinders may be used for sinking each succeeding section.

Figure 14:
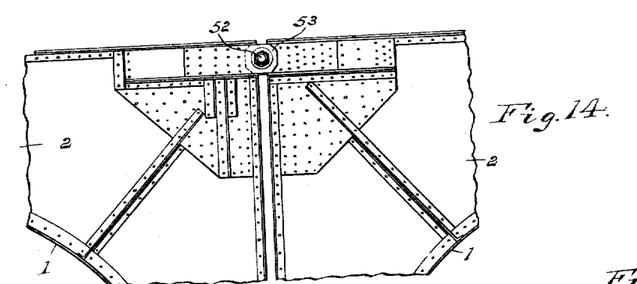
Figs. 14 and 15 illustrate in elevation and horizontal section the means by which the twin tubes of a section are adjustably united.
Figure 15:
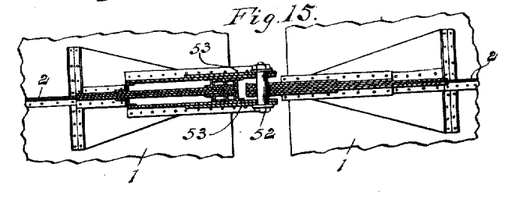
Figure 16:
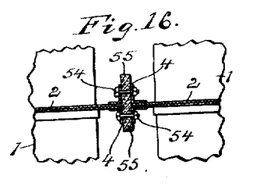
Fig. 16 is a horizontal section through the means used in addition to that shown in Figs. 14 and 15 for temporarily uniting the twin tubes of each section.

Although the two tubes of each section are preferably connected and sunk at the same time, still if considered more expedient they may be sunk one at a time. If sunk in pairs, it is advisable to so connect them that one may be adjusted longitudinally with reference to the other within a few inches of movement to provide for any difference in their length, and this adjustment may be provided for as shown in Figs. 14 and 15 by means of pintles 52 passing through spaced knuckles 53 secured to the diaphragms at their meeting edges, any suitable number of such connections being provided. The diaphragms may also be temporarily secured together at a number of places by means of bolts 54 (see Fig. 16) through the angle flanges on the meeting edges of the diaphragms, suitable spacing blocks being interposed where necessary. These latter fastenings will be removed before sinking, but where the sections have been previously fitted together on land, this will not be necessary.

Figure 4:
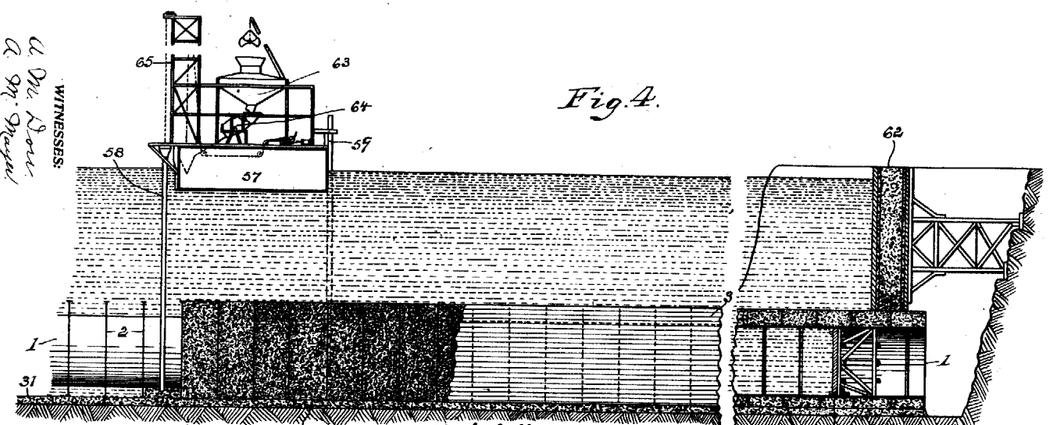
Fig. 4 is a sectional side elevation of Fig. 3, showing the shore end of the tunnel.
Figure 13:
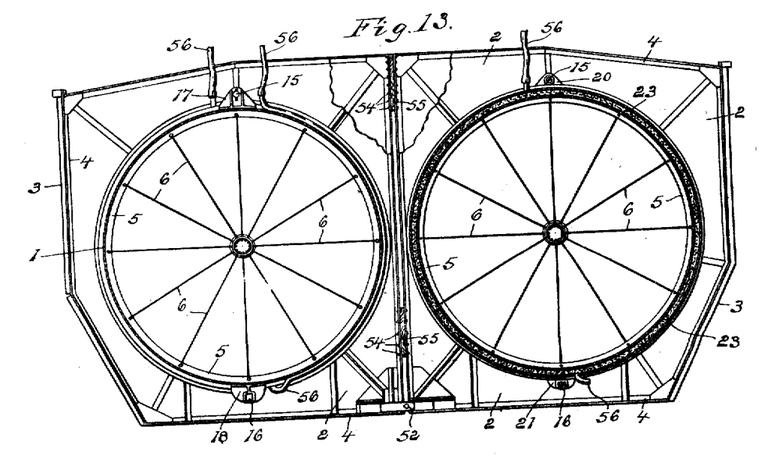
Fig. 13 is a similar cross-section substantially in the plane of the joint and illustrating the method of filling the joint with cement.

When the ends of the tube sections have been bolted together as described, the joints are tested to ascertain whether they are tight, by providing the sleeve 23 of each joint, before sinking, with two flexible connections 56, as shown in Fig. 13, which connections lead to the scow floating above. With a force pump attached to one connection and the other closed, water is forced by the pump through the annular space within the sleeve, and thus the tightness of the joint readily ascertained. When the joints have been found reasonably tight, pure cement grout is then pumped into the annular space through one of the connections until it comes out through the other connection as evidence that the space is completely filled. After the joints are thus completed the tubes are ready to be concreted in. It is proposed to do this by means of tremies 58 as shown in Figs. 3 and 4 wherein 57 represents a scow from which the work is done and which scow is anchored transversely of the sunken tubes in such a manner that its position may be readily shifted as the work progresses. This scow is provided with spuds 59 to hold it steady against wind and waves and carries a suitable outfit for hoisting the raw material on board into suitable bins 63 and for mixing and delivering the concrete to the tremies of which there are three, each supplied with its own mixer 64. These tremies are of suitable length to reach down to the bottom of the trench and if necessary the lower ends are made flexible, and they are hung on the sides of the scow from scaffolds 65 on which they are raised as the work of concreting progresses, suitable provision being made for delivering the concrete thereto at any required height.

With suitable care in the handling of the tremies the concrete can be deposited at a considerable depth by keeping their lower ends always well immersed in the outflowing concrete, the walls of the pockets keeping the water from washing out the cement. As pocket after pocket is thus filled, the foundation will be completed at the same time, since in those pockets which are not above the initial foundation the concrete will be deposited right upon the bottom of the trench.

Simultaneously with the depositing of the concrete, the space between the side walls 3 and the trench sides may be filled in with sand, clay, stone or other suitable material, the character of this back filling depending largely upon the surrounding conditions, or in some places the wash of the river may be relied on to fill in these spaces.

Figure 11:
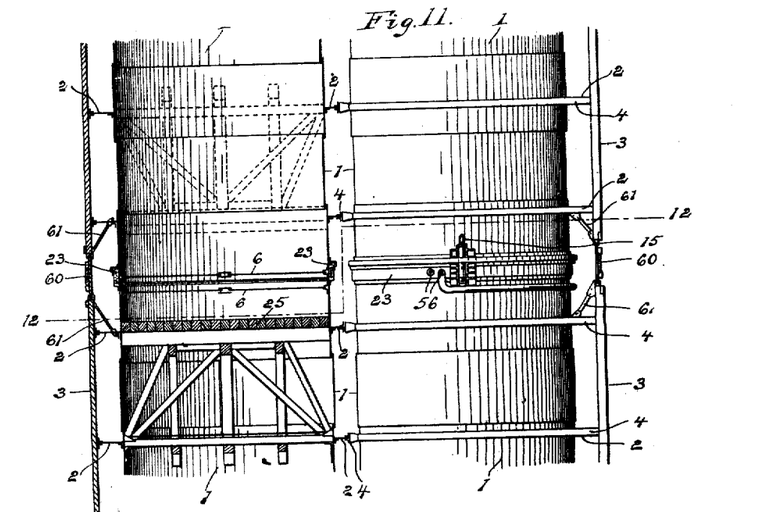
Fig. 11 is a sectional plan view of the joined ends of twin tunnel tube sections.

As it is necessary to leave an opening in the casing or side walls at the ends of the tube sections to provide access for the diver making the connection, gates 60 (Fig. 11), are provided to close these openings, braces 61 being also provided to strengthen the casing at these points.

In order to make the connections at the shore ends of the tunnel, a pocket is dredged into the bank or shore and when the tubes have been sunk and concreted in, the shore end thereof is inclosed within a coffer dam or seawall 62, as shown in Fig. 4. The pocket is then pumped out and used as a working shaft for lining the tubes before making final connection with approach tunnels. To permit work on the inner concrete lining to be commenced as soon as possible, the bulkheads at the shore ends of the tubes and one in every other tube section should be built very heavy and water tight so as to be capable of resisting the full water pressure, the other bulkheads need not be so heavy. Through suitable valved apertures provided in these heavy bulkheads one section after another may be emptied of the water and the bulkheads removed to give access to the section beyond.

This particular construction of steel tubes and the manner in which the joints between the sections are made, practically eliminates the possibility of leakage, and the general scheme of construction is such that the use of compressed air is dispensed with, eliminating its dangers and disadvantages and the necessity for the installation of an expensive plant.

While the construction of the tunnel as herein described and shown in the drawings is primarily devised for navigable waters and has been specifically designed for the tunnel under present construction across the Detroit river, it is adapted to meet the general requirements, and its structural features are adapted to be used wherever the open trench method of building tunnels may be applied. It is also obvious that the construction may be variously modified within the scope of my invention to suit prevailing conditions. Thus any other suitable foundation may be used in connection with the other features of my invention and my plan of providing a foundation of concrete may be variously modified as for instance by omitting the initial foundation under the middle of the tube and then after the tube is laid by first filling in the space below the tube with concrete at one or more points intermediate the ends and allowing the concrete to harden before proceeding with the embedding of the tube.

The advantages of my construction in cost, safety and general applicability to meet the requirements will be well understood by those skilled in the art, none of the steps in the construction involving any difficult engineering problems and the equipment required being easily procurable and representing but a small portion of the cost of construction.

Having thus fully described my invention what I claim is:—

1. In subaqueous tunnel construction the herein described method of laying a tunnel tube or a section thereof which consists in constructing the same on land with an outer supporting frame adapted to form the sides, ends and division walls of a form for embedding it in concrete, the division walls dividing the form transversely into compartments, excavating upon the water bed a trench, the bottom of which is below the level required for supporting the tube, constructing upon said bottom a foundation adapted to support the tube upon the required level, sinking the tube upon said foundation and then embedding it in concrete by introducing the material into the compartments formed by the outer frame.

2. The method of laying subaqueous tunnel sections which consists in constructing the metallic portion of the tunnel tube on land in temporarily closed connectible sections with an outer frame or cradle adapted to serve as a form for embedding the section in concrete, dredging out a section of the water bed of the tunnel-site, laying a foundation upon the excavated site at intervals, laying the first section of the tunnel tube upon the prepared site, embedding it in concrete and simultaneously back filling the section, and then adding other like sections successively in the same manner.

3. The method of constructing subaqueous tunnels in sections, which consists in constructing the metallic portion of the tunnel tube on land in temporarily closed connectible sections each having an outer frame or cradle adapted to serve as a form for embedding it in concrete, preparing the water bed for the shore end section of the tunnel, laying the initial tunnel tube section upon said water bed, embedding it in concrete, successively adding other sections in like manner, each section being connected to the previously laid section, then constructing a working shaft at the shore end of the tunnel and completing the tunnel by establishing connection between said working shaft and the interior of the tunnel.

4. The method of constructing subaqueous tunnels of the character described, which consists in dredging out a section of the water bed beginning at the shore end of the tunnel site, laying upon said bed at intervals a foundation, sinking upon said foundation a section of a metallic tunnel tube temporarily closed by bulkheads and having an outer casing or frame adapted to support it upon the foundation and serve as a form for embedding it in concrete, embedding the section in concrete, continuing in like manner to add other sections of the tunnel tube, and completing the tunnel by constructing a working shaft at the shore end of the tunnel and establishing connections with the interior of the tunnel tube.

5. The method of constructing subaqueous tunnels of the character described, which consists in constructing a section of metal tunnel tube with an outer casing or frame adapted to serve as a form for embedding it in concrete and having the ends temporarily closed with bulkheads, excavating a trench in the water bed corresponding to the length of the tube section, laying upon the bed of the trench at intervals a foundation of concrete with metal grids embedded therein, laying upon said prepared foundation the metal tube section, embedding the same in concrete and simultaneously therewith back filling the trench, successively constructing other tunnel tube sections and proceeding in like manner to lay each section.

6. The herein described method of providing a foundation in the construction of tunnels of the character described, which consists in first excavating a trench in the water bed corresponding in length to the length of the section to be laid in it, sinking upon the bed of said trench one or more metal grids having downwardly projecting anchor posts adapted to support the grid at variable heights above the bed of the trench, adjusting said grid or grids to the required level for supporting the tunnel section to be laid thereon and then embedding the grid or grids in concrete.

7. The herein described method of sinking a tunnel tube section upon the tunnel site, which consists in closing the ends with removable water-tight bulkheads, floating the section to its proper location and mooring it in position thereon, securing upon the section at opposite ends air cylinders proportioned to support by their buoyancy the weight of the section when submerged and filled with water, sinking the tube by admitting water into it and permitting the air to escape till the section is submerged and supported by the air cylinders, and then gradually lowering it to the water bed by the aid of suitable hoisting tackle from a scow moored alongside, the buoyancy of the air cylinders being simultaneously reduced till a small fraction of the weight is sustained by the hoisting tackle.

8. The herein described method of sinking a tunnel tube section upon the tunnel site, which consists in providing the tube with removable water-tight bulkheads at the ends and with semi-partitions on top intermediate the ends, floating the section to its proper location, mooring it in position thereon, securing upon its opposite ends air cylinders proportioned to support by their buoyancy the weight of the section when submerged and filled with water, causing the section to sink by admitting water and simultaneously maintaining its equilibrium by controlling the escape of the air from the space between the bulkheads and the semi-partitions till the section is submerged and supported by the air cylinders, and then lowering the section upon its water bed under control of suitable hoisting tackle from a scow moored alongside, the buoyancy of the air cylinders being simultaneously reduced till a small portion of the weight is sustained by the hoisting tackle.

9. The herein described method of constructing tunnels in sections, which consists in successively constructing the tunnel tube in bulkheaded metallic sections with connectible ends, one of which fits loosely into the end of the other section and forms a water-tight joint therewith when the sections are tightly drawn together, in excavating a trench in the water bed and laying a foundation thereon, floating the initial section to the tunnel site and mooring it in position thereon, sinking it upon the water bed with air cylinders temporarily attached thereto and supporting by their buoyancy the greater portion of the weight of the section, removing the air cylinders after the section is brought into justified position, permanently securing it to the water bed by embedding it in concrete, and then continuing to construct and sink other light sections in like manner successively, each section being sunk in close proximity to the previously laid section and connected thereto by hauling lines passing from the previously laid section to the section to be connected thereto in guiding relation.

10. The method of constructing subaqueous tunnels in sections, which consists in constructing the tube of each section with an outer frame adapted to support the tube out of contact with the water bed and serve as a form for embedding it in concrete, excavating a trench in the water bed corresponding to the length of the metal tube section, laying at intervals upon the bottom of the trench a bed of concrete, laying the metal tube section upon said bed and then embedding the whole tube in concrete by means of tremies vertically adjustably suspended from a working scow moored above the section and of a length adapted to reach the bottom of the trench.

11. The method of constructing subaqueous tunnels in sections, which consists in constructing the metal tube of each section with an outer frame adapted to support the tube out of contact with the water bed and serve as a form for embedding it in concrete, excavating a portion of the water bed to form a trench to receive the section, laying at intervals upon the bottom of the trench a bed of concrete with steel grids embedded therein, laying the tube section upon this prepared bed and then embedding it in concrete by means of tremies vertically adjustably suspended from a working scow moored above the section and suitably equipped for mixing the concrete on board the scow and delivering it to the tremies.

12. The method of sinking a buoyant tunnel tube section to the water bed, which consists in temporarily attaching upon the section air cylinders adapted to support by their buoyancy the weight of the section when submerged, submerging the tube till it is supported by the air cylinders, admitting water into the tube and simultaneously controlling its sinking by controlling the escape of the air from portions of said tube formed into separate air chambers, then gradually reducing the buoyancy of the air cylinders and controlling the sinking of the section by gradually lowering it with hoisting tackle on a working scow moored alongside, the section being sunk upon a prepared foundation upon which it may be drawn into justified position while being held under control.

13. The herein described method of constructing subaqueous tunnels with preconstructed tunnel tube sections which consists in first preparing a water bed for the section to be laid upon a lower level than the one upon which the section is to be placed and constructing upon said water bed at two or more points foundations adapted to support the section thereon at the desired level, in preconstructing the section to be laid thereon with an outer frame adapted to serve in connection with the prepared water bed as a form for embedding the tube, sinking the section upon the prepared foundations and adjusting it thereon in position and thence completing the foundation and embedding the tube by introducing the material therefor into the form.

In testimony whereof I affix my signature in presence of two witnesses.

OLAF HOFF.

Witnesses:
OTTO F. BARTHEL,
A. M. DORR.